United States Patent
Webb et al.

(10) Patent No.: US 7,822,348 B2
(45) Date of Patent: Oct. 26, 2010

(54) ADAPTIVE PULSE SHAPE CONTROL

(75) Inventors: Stephen Michael Webb, Kent (GB); Richard Oberland, London (GB)

(73) Assignee: Xtera Communications, Inc., Allen, TX (US)

( * ) Notice: Subject to any disclaimer, the term of this patent is extended or adjusted under 35 U.S.C. 154(b) by 557 days.

(21) Appl. No.: 11/369,386

(22) Filed: Mar. 7, 2006

(65) Prior Publication Data
US 2006/0210210 A1  Sep. 21, 2006

Related U.S. Application Data

(60) Provisional application No. 60/659,293, filed on Mar. 7, 2005.

(51) Int. Cl.
*H04B 10/04* (2006.01)

(52) U.S. Cl. ............... 398/198; 398/183; 398/186; 398/195; 398/200; 359/245; 359/247; 359/254; 385/1; 385/2; 385/3

(58) Field of Classification Search ........... 398/182, 398/183, 184, 185, 186, 187, 188, 189, 192, 398/193, 194, 195, 196, 197, 198, 200, 201; 359/245, 247, 248, 237, 238, 239, 276, 254; 385/1, 2, 3, 8, 4, 14, 31, 140
See application file for complete search history.

(56) References Cited

U.S. PATENT DOCUMENTS

| 6,148,423 | A | 11/2000 | Le Mouel et al. |
| 6,433,904 | B1 | 8/2002 | Swanson et al. |
| 6,700,907 | B2 * | 3/2004 | Schneider et al. ............. 372/26 |
| 7,113,667 | B2 * | 9/2006 | Welch et al. ................... 385/24 |
| 7,184,671 | B2 * | 2/2007 | Wang ........................... 398/195 |
| 2002/0114047 | A1 * | 8/2002 | McBrien et al. ............. 359/180 |
| 2003/0175037 | A1 * | 9/2003 | Kimmitt et al. ............. 398/198 |

FOREIGN PATENT DOCUMENTS

WO  WO 02/091634  11/2002

* cited by examiner

*Primary Examiner*—Hanh Phan
(74) *Attorney, Agent, or Firm*—Workman Nydegger (57) ABSTRACT

A method, apparatus, and computer program product are provided for optimizing the pulse shape of optical signals output from an optical transmitter. The optical transmitter includes an optical modulator controlled by a bias voltage and a signal drive level, wherein the bias voltage and signal drive level are controlled automatically in a systematic way in dependence on one another to adapt the pulse shape of an optical output signal for optimal transmission over a transmission line.

15 Claims, 9 Drawing Sheets

ADAPTIVE PULSE SHAPE CONTROL

CROSS-REFERENCE TO RELATED APPLICATIONS

This application claims the benefit of U.S. Provisional Application Ser. No. 60/659,293, filed Mar. 7, 2005, which is incorporated herein by reference.

BACKGROUND TO THE INVENTION

Optical transmitters for long haul applications at multi-gigabit rates are usually implemented by use of a Lithium Niobate Mach Zehnder (MZ) modulator to gate continuous wave (CW) laser light. The component is well established and applicable but has some detrimental drift and ageing characteristics that require external control to maintain peak performance.

Conventionally these control circuits are arranged to optimise optical extinction ratio and maintain a maximum modulation depth. Typically, drive level and bias voltage are adjusted separately and the effect monitored by sampling the average transmitter output signal power. Conventionally, the AC coupled input signal drive voltage summed with a DC bias is arranged to exercise the modulator from its peak output light level to its minimum output light level in a closely linear fashion. Such operation will optically re-create a representation of the input signal be it return-to-zero (RZ) or non return-to-zero (NRZ) in format. It is conventionally assumed that the control methods should optimise extinction ratio (ER) and achieve a symmetrical output waveform of 50% duty cycle, and that this will lead to ideal transmission through the system.

However, in practice long haul transmission systems suffer from non-linear distortion, dispersion and self-phase modulation (SPM) effects.

Dispersion effects can in theory be addressed by adjusting the dispersion settings before and after the effects occur (i.e. pre- and post-transmission). There will be a particular amount of pre- and post- dispersion setting adjustment required to obtain best transmission for a given signal. This may be done by passing the signal from each channel through a dispersive element at both the transmission and receiver ends. However, it is not operationally or economically practical to fine tune the launch and receive dispersion values of every channel in a WDM signal in this way.

SPM impairments are often evident on the rising and falling edges of a return-to-zero (RZ) format, whereas SPM is only evident on the '1-0' or '0-1' transitions of non-return-to-zero (NRZ) formats.

It has been found that a clock chirped RZ (CRZ) format may be used to alleviate some of the unwelcome effects of SPM and dispersion. In particular, the chirp may be used to partially mitigate dispersion and the SPM effects at the transition edges. For these reasons, a chirped RZ (CRZ) format has been developed for use in long haul transmission systems.

Chirp is typically added to the RZ signal by a Lithium Niobate phase modulator placed after the data modulator. A clock driver set to be synchronous with the data signal drives this phase modulator.

Though the combination of a CRZ format and appropriately chosen dispersive fibres described above has some success in combating SPM, non-linear distortion, and dispersion in the transmission fibre it suffers from a number of drawbacks. In particular, this solution is both complex and expensive. For example, the clock driver and phase modulator are costly and must be calibrated and tested if they are to be effective.

SUMMARY OF THE INVENTION

According to a first aspect of the present invention, there is provided a method of controlling an RZ optical transmitter, the optical transmitter including an optical modulator controlled by a bias voltage and a signal drive level, wherein the bias voltage and signal drive level are controlled automatically in a systematic way in dependence on one another to adapt the pulse shape of an optical output signal for optimal transmission over a transmission line.

According to a second aspect of the present invention, there is provided an RZ optical transmitter for generating an optical output signal comprising an optical modulator controlled by a bias voltage and a signal drive level, the transmitter further comprising a controller for modifying automatically the bias voltage and signal drive level in a systematic way in dependence on one another to adapt the pulse shape of an optical output signal for optimal transmission over a transmission line According to a third aspect of the present invention, there is provided a computer program product comprising computer executable code for generating and outputting control signal values for a bias voltage and a signal drive level of an optical modulator in an RZ optical transmitter, wherein the bias voltage and signal drive level values are generated automatically in a systematic way in dependence on one another to adapt the pulse shape of an optical output signal of the optical transmitter for optimal transmission over a transmission line.

Conventional RZ transmitters generally have as an aim the production of a regular sinusoidal pulse shape and this shape is never systematically adapted according to line design. The present invention provides an adaptive pulse shape that is automatically optimised, preferably on the basis of data collected at a receiver, and more preferably to minimise the received bit error rate (BER), and thereby releases the potential of non-standard (i.e. non-sinusoidal) pulse shapes to improve the reliability, durability and efficiency of optical communications. In particular, the present invention allows dispersion penalties to be minimised and system channel power to be maximised.

Alternative methods of improving line performance have been suggested. For example, a chirped RZ (CRZ) modulation format has been utilised which gives a significant performance benefit over simple RZ modulation formats. However, the circuitry and components required to produce CRZ have proved costly. The present invention has been shown to provide performance benefits similar to those of CRZ while not incurring the associated cost of the chirp inducing elements. It is thus a significant advantage of the present invention that it may be implemented without the need for expensively engineered electro-optical hardware and associated drive circuitry.

It is a further advantage of the present invention that it may adjust both the bias voltage and signal drive level modulation parameters of the optical transmitter on the basis of data collected at a remote optical receiver. Consequently, it is possible for the present invention to adjust the bias voltage and signal drive level parameters in a systematic way to take into account both linear and non-linear degradation of the optical signal in the transmission line.

Preferably, the optical modulator may be controlled to be under-driven or over-driven in order to produce a pulse shape for optimal transmission.

Preferably, the optical modulator is a Mach-Zehnder (MZ) interferometer. MZ modulators have a sinusoidal transfer function and in the present invention the bias voltage and signal drive level are controlled to distort the pulse shape produced by the MZ modulator.

The present invention may be used in conjunction with conventional methods of optimising optical transmitter output. Conventional methods may be adopted for back-up purposes or to additionally refine the transmitter modulation parameters.

The present invention is implemented in a system using an RZ data modulation format. RZ formats commonly use forward error correction (FEC) and consequently, provide for BER to be measured relatively easily. However, it is possible to implement the present invention using any of the commonly used RZ data modulation formats. For example, it is envisaged that the present invention may be used with carrier-suppressed RZ (CSRZ), chirped RZ (CRZ), Differential Phase-Shift Keyed RZ (RZ-DPSK) and Quadrature Phase-Shift Keyed RZ (RZ-QPSK).

The present invention supports optical RZ formats generated by gating (or pulse carving) data modulated signals, for example optical RZ and RZ-DPSK. These signal formats are conventionally achieved using an additional MZ modulator driven by a clock signal. It is to be understood in this case that the additional MZ modulator, which functions as an optical gate, is also controlled in accordance with the present invention. Thus the optical transmitter is not limited to consisting of only a single optical modulator A typical implementation of the present invention is in a bi-directional link with two end-points. The system is symmetrical: the bias voltage and drive signal level modulation parameters of the optical transmitter at the first end-point are controlled in dependence on the BER measured at the second end-point while the same modulation parameters of the optical transmitter at the second end-point are controlled in dependence on the BER measured at the first end-point. As such, a two directional control loop is established which will optimise the modulation parameters of the optical transmitters at both end-points.

BRIEF DESCRIPTION OF THE DRAWINGS

Examples of the present invention will now be described in detail with reference to the accompanying drawings, in which.

DETAILED DESCRIPTION

Figure 1:
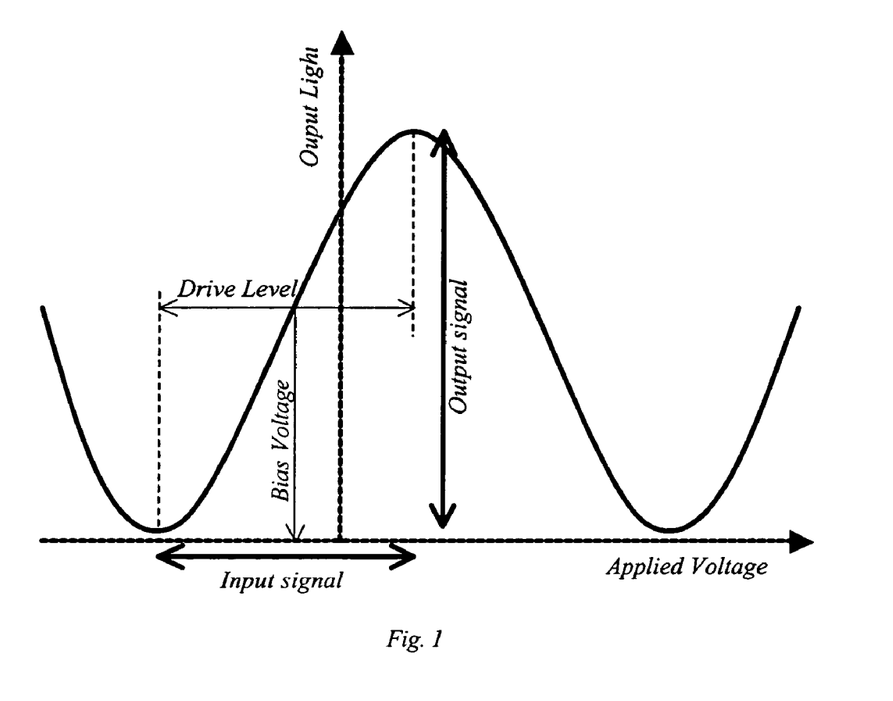
FIG. 1 illustrates the characteristic responses to drive level and bias voltage of a Lithium Niobate MZ.

MZ interferometers are commonly used in optical transmission systems. FIG. 1 shows how the output signal of a typical MZ varies with the applied voltage. As shown, the MZ is normally driven around a bias voltage by a drive level. The bias voltage is typically set for the mid-point of output power (half way between a maximum and a minimum shown in the curve shown in FIG. 1).

Figure 4A:
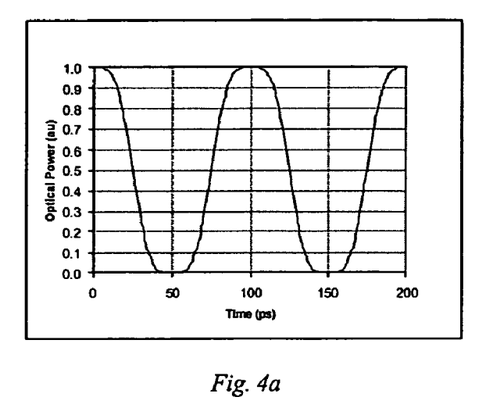
FIGS. 4a to 4c show three pulse shapes that may be used in accordance with the present invention.

The drive level is then set to maximise the extinction ratio of the signal. The extinction ratio (ER) of an optical signal is a commonly used parameter. It is defined as (light level at '1'—light level at '0')/(light level at '0'). As such, to maximise the ER the drive level is chosen to drive the MZ across its full characteristics. In this way, a maximally open data eye is achieved. FIG. 4a illustrates the resulting optical signal when the modulator is driven in this way. Conventional techniques try to ensure that this pulse shape is retained throughout the life of the transmitter.

Figure 2A:
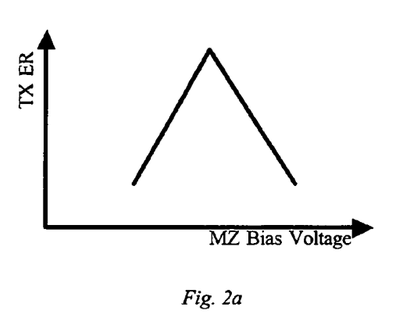
FIGS. 2a and 2b show the extinction ratio performance at the transmitter and BER performance at the receiver as a function of the MZ bias voltage.
Figure 2B:
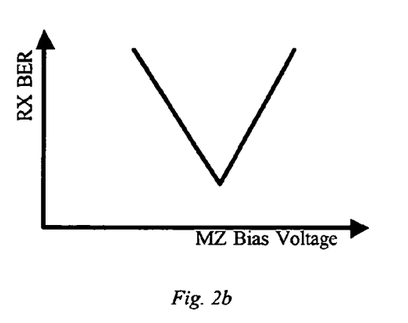
Figure 3:
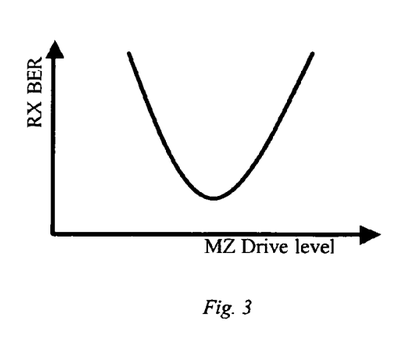
FIG. 3 illustrates the dependence of receiver BER on the MZ drive level (for a given bias voltage)

MZ interferometers commonly suffer from drift and aging effects, and consequently it may be necessary to adjust the bias voltage and drive level during system operation in order to ensure optimal performance. FIG. 2a shows the effect of variation of the drive voltage on ER at the transmitter, while FIG. 2b shows the effect on bit error rate (BER) at the receiver. Variations in the drive level have a similarly detrimental effect (as shown in FIG. 3).

For these reasons it is known to use separate feedback mechanisms to avoid drift in the bias voltage and in the drive level respectively. These separate feedback mechanisms may rely on measurements of signal characteristics at the transmitter (for example, the ER) or at the receiver (for example, BER).

Figure 5:
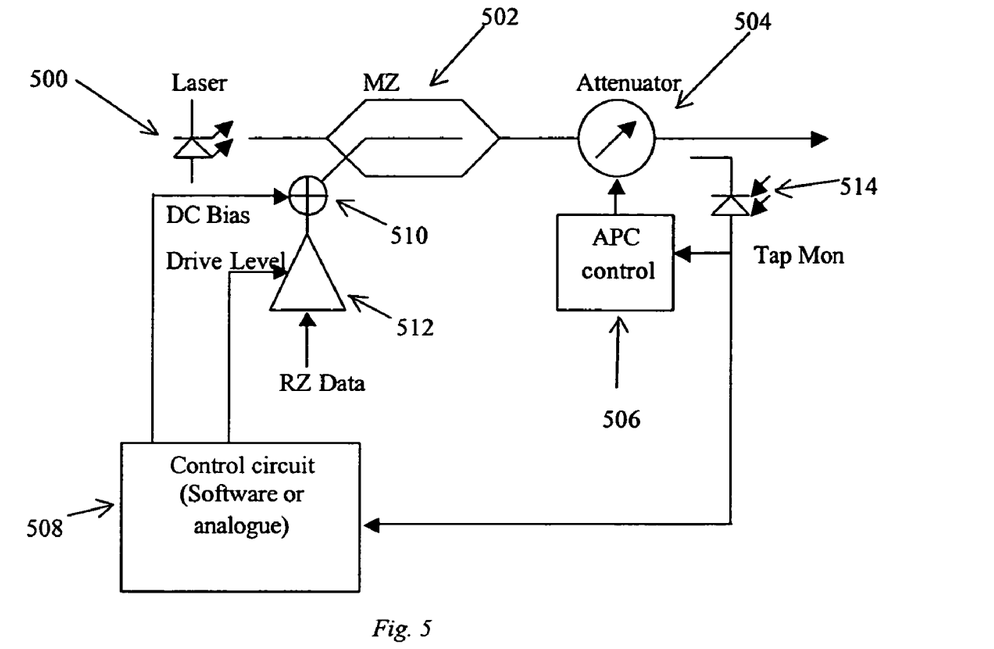
FIG. 5 schematically illustrates a transmission apparatus that may be used in accordance with the present invention.

FIG. 5 illustrates an optical transmitter set up in accordance with one embodiment of the present invention. A conventional continuous wave (CW) light source 500 is used with a conventional MZ interferometer 502. An automatic power control (APC) feedback loop 506 is placed after the MZ to enable an attenuator 504 to ensure that the output power of the transmitter is fixed. A control circuit 508 controls both the bias voltage 510 and drive level 512 applied to the MZ 502. A tap monitor 514 allows the control circuit 508 to measure the output so as to control the parameters of the MZ 502 in dependence on the characteristics of the output signal.

Figure 6:
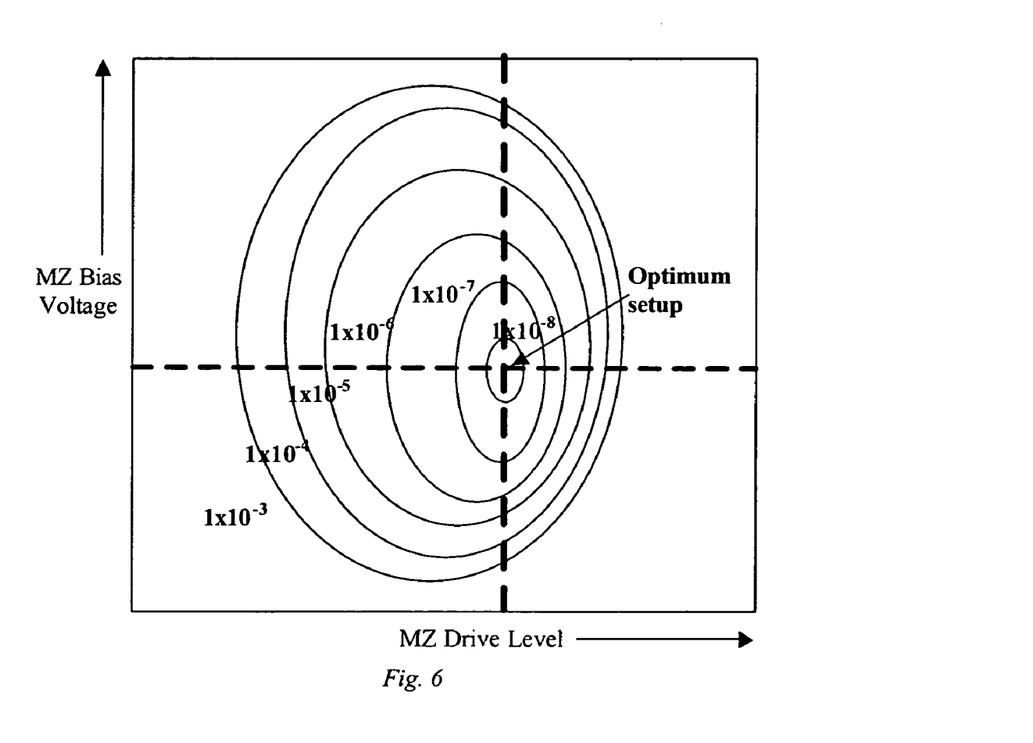
FIG. 6 shows a contour map illustrating the dependence of BER on drive level and bias voltage.

While, as detailed above, conventional techniques aim to ensure that the output signal is of the type shown in FIG. 4a, the present invention is not constrained in this way. The present invention recognises that the optimal drive voltage and the optimal bias voltage are interdependent qualities in a system. FIG. 6 is a contour map illustrating how the BER measured at the receiver may be represented by a function of both drive level and bias voltage. As shown, there exists a minimum in this graph where the combination of these variables results in optimum transmission performance. The shape of this graph will depend on the nature of the transmission line (including any non-linear effects).

The present invention recognises that by tuning through a spectrum of settings for bias and drive voltage it is possible to find the optimal pulse shape that achieves best transmission performance, either though a linear dispersive system or one that is non-linear.

When the transmitter of the present invention is initially set up the bias voltage and drive level are set at the minimum shown in FIG. 6. In one preferred embodiment, this is done by optimising the values in a linear environment (resulting in the pulse shape shown in FIG. 4a) before running an algorithm based on BER to optimise the settings in the non-linear system in which the transmitter is used. The BER algorithm is discussed further below. The bias voltage and drive level settings may be constantly updated through a feedback loop or may be left to run after initial set up until an event (such as the replacement of a component in the transmission line) requires recalibration.

Figure 4B:
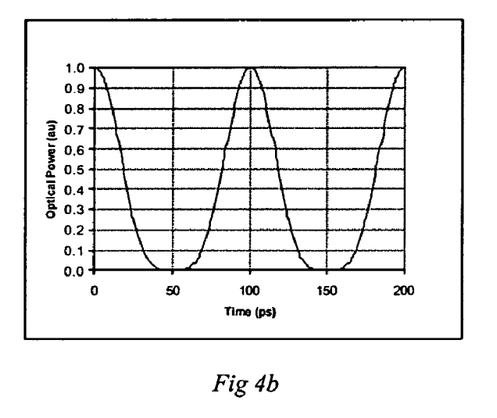
Figure 4C:
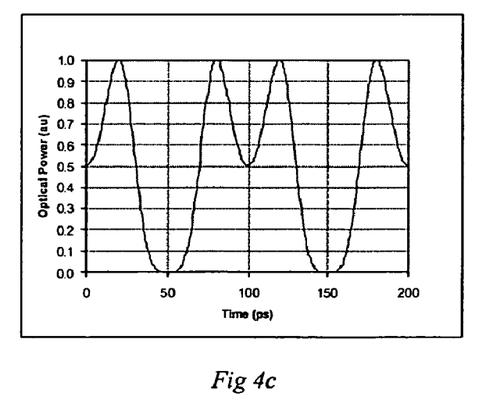

FIGS. 4b and 4c show pulse shapes that may be optimal in non-linear and/or dispersive conditions. The present invention is able to utilise these since it is not required to retain the conventional sinusoidal pulse shape shown in FIG. 4a. FIG. 4b shows an underdriven signal (i.e. the drive level has been reduced). As shown, the underdriven signal produces a more triangular pulse shape, with shallower rise and fall profiles. The signal shown in FIG. 4b is normalised with those shown in FIG. 4a and 4c by the APC.

FIG. 4c shows an overdriven signal. As shown, the '1' level folds over to produce a double peaked data eye. The rise and fall profiles of this pulse are steeper than those in FIGS. 4a and 4b.

Non-linear effects in the transmission line are often related to the shape of the pulse edges, and in particular the rise and fall times. Moreover, the fold in the pulse shape caused by overdriving a signal may also be relevant in this regard. For this reason, the pulse shapes shown in FIGS. 4b and 4c are often more effective than that shown in FIG. 4a.

Figure 7A:
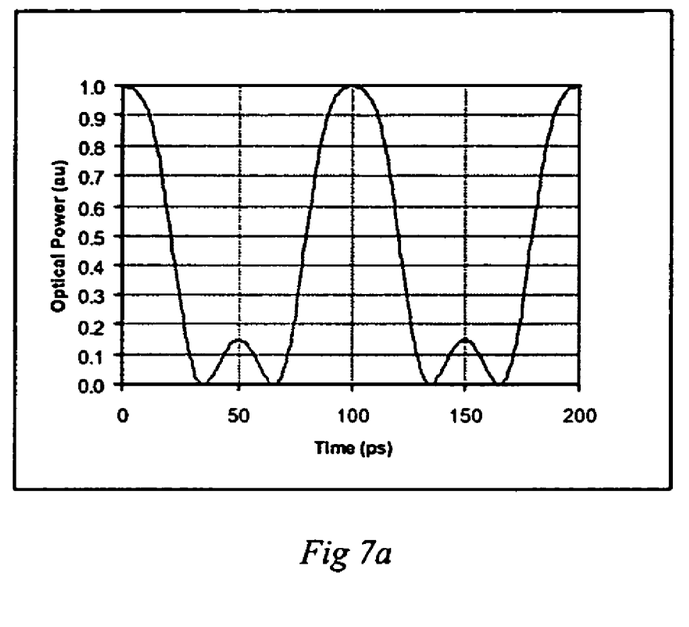
FIG. 7a and 7b show pulse shapes with sub-optimally selected bias voltages.
Figure 7B:
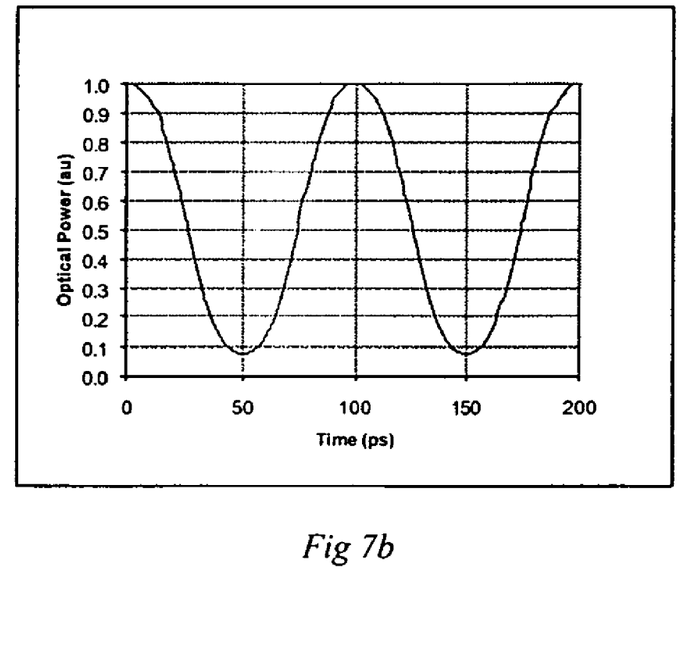

The interdependence of the bias voltage and the drive level is illustrated by FIGS. 7a and 7b. As in FIG. 4c, the signal depicted in FIG. 7a is overdriven. However, in this case the bias voltage is set too low (for this drive level) resulting in a closed eye at the '0' points. This leads to a reduced ER and sub-optimal transmission characteristics. The pulse shown in FIG. 7b is underdriven. However, the bias voltage in this case is set too high (for this drive level) and the zero output power point is consequently never reached, again resulting in a sub-optimal ER.

Once the present invention has been set up, a feedback loop or other control mechanism may be used to ensure that the bias voltage does not drift away from the optimum and result in pulse shapes such as those shown in FIG. 7.

A preferred embodiment of the present invention uses BER feedback from the receiver in order to optimise the bias voltage and drive level settings.

A statistically reliable method of estimating BER is disclosed in the Applicant's co-pending application (U.S. patent application Ser. No. 11/072861). Having calculated the BER a simple control loop can be used to adjust the bias voltage and drive level until the BER is at its minimum. This method of optimising the modulator parameters is automatic and superior to the conventional controller, by way of accuracy, drift and associated set-up during manufacturing.

The preferred embodiment therefore achieves a variable transmitter pulse shape whilst maintaining an optimal BER as measured at the receiver. A significant advantage is thus provided over previous systems since to a great extent long haul optical transmission involves the balancing of non-linear optical effects and dispersion within the optical fibre and it is often found that transmission may be improved by subtle changes of pulse shape. These changes typically affect the impact of phenomena such as self-phase modulation (SPM) on pulse edges. The present invention effectively achieves a constrained but matched pulse shape for best transmission.

Figure 8:
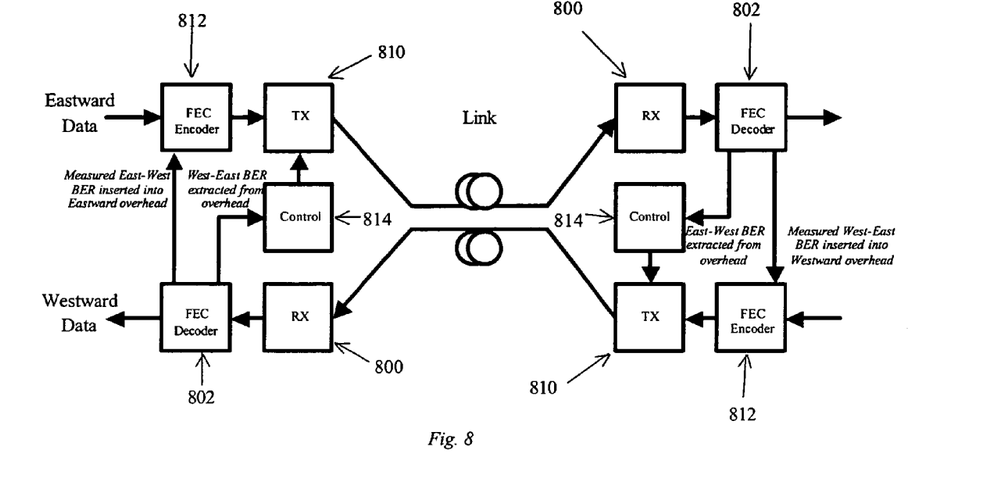
FIG. 8 shows a schematic diagram of a bi-directional link in accordance with the present invention.

In one preferred embodiment of the present invention, a cable link is used in a two directional symmetrical system comprising two end-points separated by a great distance. As shown in FIG. 8, each end point contains a receiver (RX) 800 and a transmitter (TX) 810. In use, transmitted data is encoded by an FEC encoder 812 before being transmitted from a first end-point. BER is measured using a FEC decoder 802 associated with the RX 800 of the second end-point and this data is transmitted back to the first end-point. Once data indicating the BER has been received at the first end-point, a control circuit 814 is used to optimise the MZ parameters (for example bias voltage and signal drive level) of the TX 810. It is usually convenient to transport this BER information in the spare bytes of a FEC data frame structure as an overhead, but other means may be used if desired. Both end-points operate in this way and so a two-way control loop is achieved.

The TX optimisation algorithm is preferably implemented in a digital control process (software) whereby analogue control voltages are created by digital to analogue converters (DAC's) and drive the MZ bias, and the RF driver gain control or the pulse width or shape of the electrical drive signal. Once the apparatus has been initially set up, it may, in certain applications, be desirable to fix one of the signal drive level and the bias voltage while only optimising the other of these variables.

In this embodiment, the algorithm used is a conventional peak searching process where maximal performance is found by taking small dither steps on the control variable, and each time stepping further in the direction that achieves improvement. For example, when optimising the bias voltage:

Start loop:
Increase MZ bias voltage
Measure BER1
Decrease MZ bias voltage
Measure BER2
If BER1>BER2 Decrease MZ bias voltage further
If BER2>BER1 Increase MZ bias voltage further
Repeat loop The step sizes may be tuned and optimised for the particular application. If the gain control voltage is optimised concurrently with the bias voltage, the algorithm may be chained in some way. An example of a chained algorithm for optimising bias voltage and the signal drive level is as follows:

Start loop:
Increase MZ bias voltage
Measure BER1
Decrease MZ bias voltage
Measure BER2
If BER1>BER2 Decrease MZ bias voltage further
If BER2>BER1 Increase MZ bias voltage further
Increase MZ drive voltage
Measure BER3
Decrease MZ drive voltage
Measure BER4
If BER3>BER4 Decrease MZ drive voltage further
If BER3>BER4 Increase MZ drive voltage further
Repeat loop The above represents only an exemplary algorithm, it is recognised that there exist generically known and elegant approaches to single variable feedback for multi-parameter control such as the "Nelder-Mead simplex algorithm". Other examples of algorithms which attempt to find a global minimum are "Simulated Annealing" and "Genetic Algorithms".

Figure 9A:
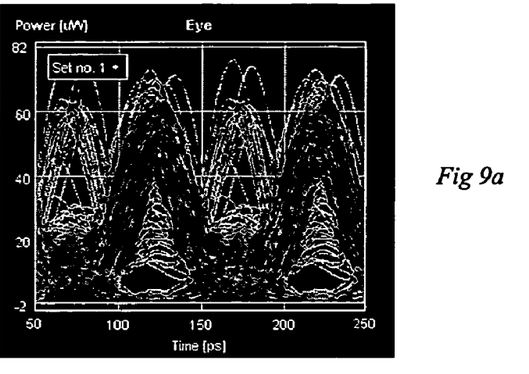
FIGS. 9a to 9c illustrate the effects of chirp and adaptive pulse shaping on the signal received over a long-haul transmission system.
Figure 9B:
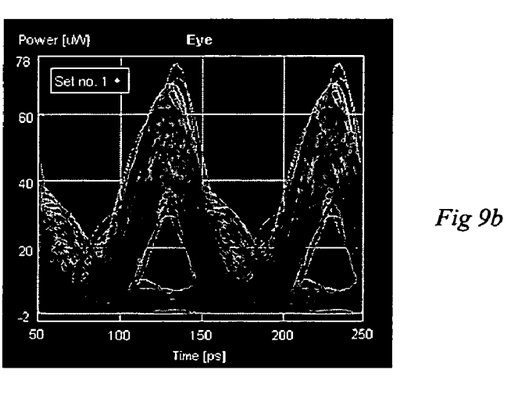
Figure 9C:
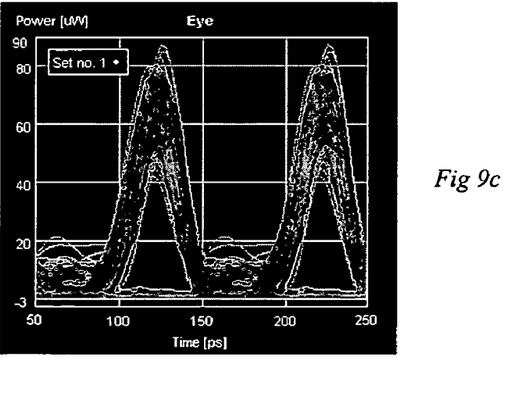

The present invention adopts non-standard pulse shapes (for example, those shown in FIGS. 4b and 4c) in such a manner as to overcome non-linear distortion or dispersion and SPM effects without the need for a CRZ format (and the associated complex and costly equipment). This is illustrated in FIGS. 9a to 9c. These figures show signals received after passing through a 6000 km non-linear transmission system.

FIG. 9a shows the signal received when a conventional RZ pulse (such as that shown in FIG. 4a) is used. As shown, there is a degree of eye closure. The performance of the receiver is thus somewhat compromised. FIG. 9b shows the effect of introducing appropriate chirp to the RZ signal (thereby creating a CRZ data format). It is clear that the received signal is clearer than that shown in FIG. 9a.

FIG. 9c shows the signal received when the pulse shape is suitably adapted according to the present invention. As shown, the performance is comparable to that of CRZ and a marked improvement on conventional RZ. There is no requirement to fine adjust pre-dispersion or to add phase modulation to achieve these results.

Figure 10:
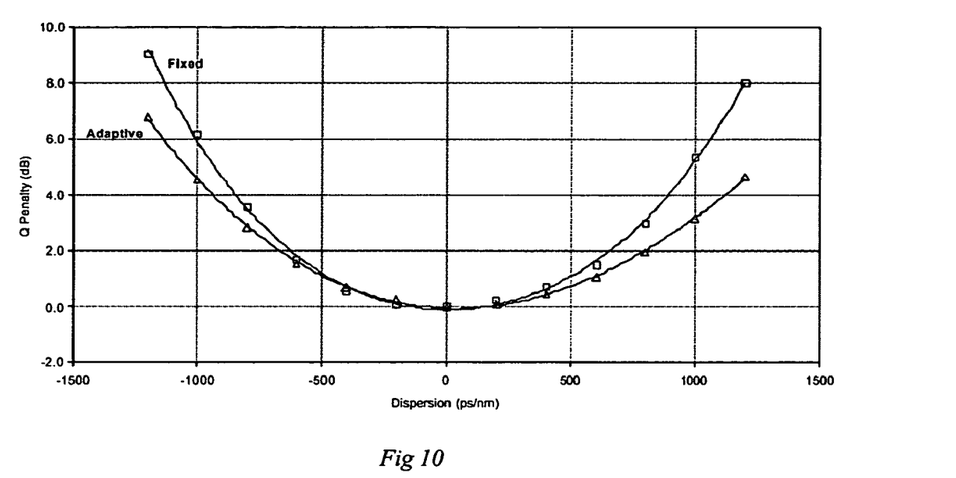
FIG. 10 shows the dispersion tolerance for fixed pulse shaped and adaptively pulse shaped RZ.
Figure 11:
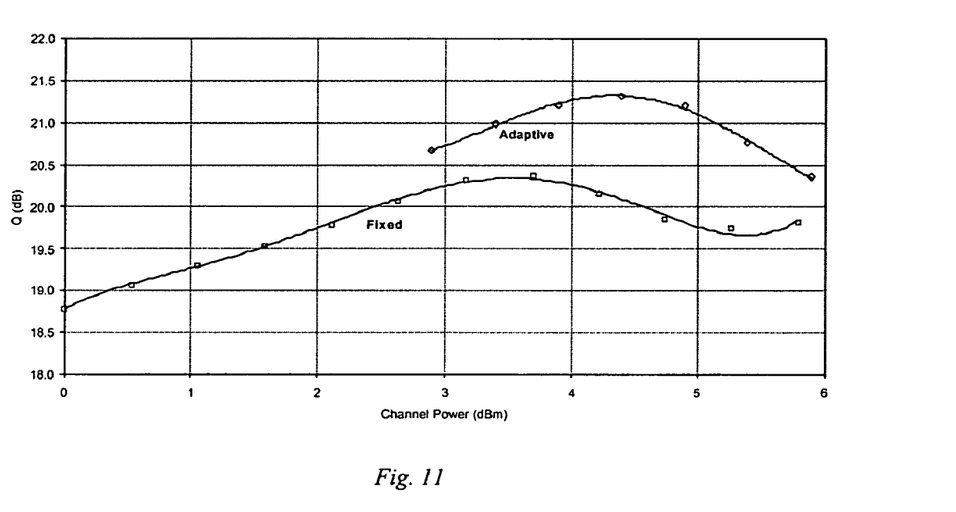
FIG. 11 shows an example of non linear tolerance for fixed pulse shaped and adaptively pulse shaped RZ.

FIGS. 10 and 11 further demonstrate the advantages that may be achieved with the present invention. FIG. 10 shows the improvement to the dispersion penalty that may be achieved while FIG. 11 illustrates how system channel power may be increased for better Q.

Figure 12:
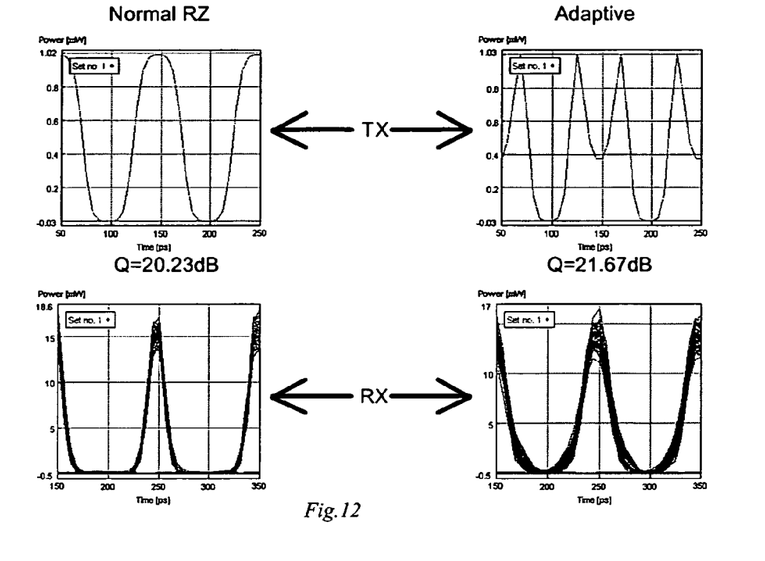
FIG. 12 shows example eye diagrams taken at both transmitter and receiver for fixed pulse shaped and adaptively pulse shaped RZ propagated through a dispersive and non-linear system; and, FIG. 13 shows a comparison of the effect of fixed pulse shaped and adaptively pulse shaped RZ on both transmitter and receiver spectra.
Figure 13:
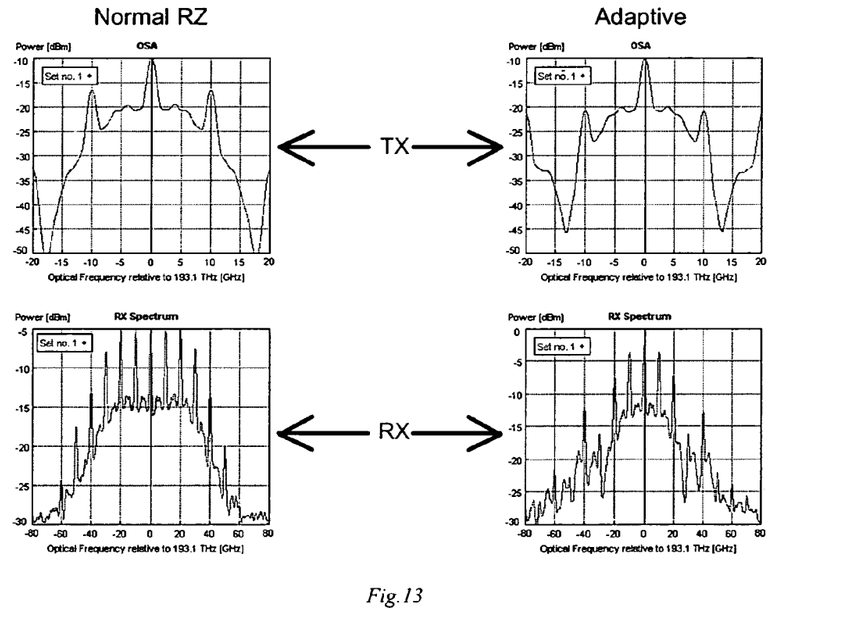

FIGS. 12 and 13 further illustrate the advantageous effect of using the adaptive pulse shape control of the present invention. In the specific example shown, the data modulation format used is return-to-zero (RZ) though the present invention may also be advantageously used in systems operating with alternative formats (such as carrier-suppressed RZ (CSRZ), Differential Phase-Shift Keyed RZ (RZ-DPSK), chirped RZ (CRZ), Quadrature Phase-Shift Keyed RZ (RZ-QPSK), and optically gated non return-to-zero (NRZ) leading to an RZ format). FIG. 12 illustrates, in the time domain, transmit and receive data eyes for conventional RZ and adaptively pulse shaped RZ control systems. FIG. 13 shows the result in the frequency domain and from this the spectral improvement can be clearly seen. Here the received spectrum for the conventional RZ case has been corrupted by SPM within the transmission system. Consequently, some signal photons will fall outside the particular receiver optical filter bandwidth. With the adaptive approach a more compact spectrum is achieved (indicating less SPM), with an associated increase in signal to noise ratio (SNR) and BER performance.

The present invention provides a flexible solution that may be generically applied to transmitter set-ups to automatically achieve best receiver performance. The iterative process outlined above effectively 'matches' the transmitter characteristics to the non-linearity of the transmission line. Though the description has been in the context of Lithium Niobate MZ's other types of optical modulators may be used.

BER is not the only mechanism for arriving at the optimum pulse shape. For example, Q measurement at the receiver may be used to allow an algorithm to choose the appropriate drive signal and bias voltage.

Under systems of very low BER or very high Q a control system based on these parameters will effectively freeze since there is not enough error rate information available in a reasonable periodic timescale. To maintain system margins to allow for fast transient degradation effects it is desirable to maintain the pulse shape at its optimum with an operation control loop.

In general, the maximum eye opening at the receiver corresponds to the best possible Q value. In one embodiment, a receiver incorporates an APC circuit and a peak detector. Suitable peak detectors are available and are used in the radio-frequency (RF) wireless industry. For example, an IC from Linear Technology (LTC5532) has been found to have suitable characteristics. In this way, an electrical measurement can be made of the peak level. In general, a larger peak level is indicative of a more optimal pulse shape and a control loop may therefore be based on this measurement.

There may exist other parameters of the TX that are suitable for control by the present invention. For example, control of the pulse shape of the electrical drive signal in addition to its level. This is often adjustable electrically by a particular bias voltage applied to the driver amplifier design. The range of pulse shapes that may be produced is therefore greatly increased and by controlling this aspect it is therefore possible to more accurately match the pulse shape to the transmission line statistics.

The invention claimed is:

1. A method comprising:
    an act of an optical laser transmitting continuous wave light to a modulator that is used to gate the continuous wave light received from the optical laser, the modulator configured to gate the continuous wave light in response to a bias voltage and a signal drive level applied to the modulator;
    an act of a control circuit adaptively adjusting the bias voltage and the signal drive level applied to the optical modulator, wherein the bias voltage and the signal drive level are adjusted concurrently and wherein the optical modulator is structured such that the bias voltage and signal drive level at least partially control a pulse shape of an optical output signal of the optical modulator; and
    an act of the control circuit continuing to adaptively adjust the bias voltage and signal drive level to at least partially optimize the pulse shape of the optical output signal for both linear and non-linear optical effects and dispersion in a transmission line configured to transport the optical output signal, wherein the at least partially optimized pulse shape of the optical output signal is a non-sinusoidal pulse.

2. The method in accordance with claim 1, wherein the bias voltage and signal drive level are adaptively adjusted in dependence on a bit error rate (BER) measured at a remote receiver.

3. The method in accordance with claim 1, wherein the optical modulator is a Mach-Zehnder (MZ) interferometer.

4. An optical transmitter comprising:
    a laser configured to provide continuous wave light;
    an optical modulator configured to receive and gate the continuous wave light in response to a bias voltage and a signal drive level applied to the optical modulator, wherein the optical modulator is structured such that the bias voltage and the signal drive level at least partially control a pulse shape of an optical output signal of the optical modulator; and
    a control circuit configured to adaptively adjust the bias voltage and signal drive level applied to the optical modulator to at least partially optimize the pulse shape of the optical output signal for both linear and non-linear optical effects and dispersion in a transmission line configured to transport the optical output signal, wherein the bias voltage and signal drive level are adjusted concurrently, wherein the at least partially optimized pulse shape of the optical output signal is a non-sinusoidal pulse.

5. The optical transmitter in accordance with claim 4, wherein the bias voltage and signal drive level are adaptively adjusted in dependence on a bit error rate (BER) measured at a remote receiver.

6. The optical transmitter in accordance with claim 4, wherein the optical modulator is a Mach-Zehnder (MZ) interferometer.

7. A system for optimizing transmission between two end-point nodes in an optical link, the system comprising:
   a first end-point node comprising:
      a first optical transmitter configured to transmit optical signals, the first optical transmitter including an optical modulator configured to modulate continuous wave light provided by a transmission laser in response to a bias current and a signal drive level applied to the optical modulator, wherein the optical modulator is structured such that the bias voltage and the signal drive level applied to the optical modulator at least partially control a pulse shape of the optical signals transmitted by the first optical transmitter;
      a first optical receiver configured to receive data indicative of one or more transmission parameters of the optical signals transmitted by the first optical transmitter; and
      a control circuit configured to adaptively adjust the bias voltage and signal drive level applied to the optical modulator based on the data received by the first optical receiver; and
   a second end-point node that is coupled to the first end-point node through an optical fiber link, the second end-point comprising:
   a second optical receiver configured to receive the optical signals transmitted from the first optical transmitter and to determine the one or more transmission parameters of the optical signals transmitted from the first optical transmitter; and
      a second optical transmitter configured to transmit the data indicative of the one or more transmission parameters to the first optical receiver;
      wherein the control circuit adaptively adjusts the bias voltage and signal drive level applied to the optical modulator until the pulse shape of the optical signals transmitted by the first optical transmitter is at least partially optimized for both linear and non-linear optical effects and dispersion in the optical fiber link coupling the first optical transmitter and the second optical receiver, wherein the bias voltage and signal drive level are adjusted concurrently, wherein the at least partially optimized pulse shape of the optical output signal is a non-sinusoidal pulse.

8. The system in accordance with claim 7, wherein the control circuit is a first control circuit, the transmission laser is a first transmission laser, the optical modulator is a first optical modulator, the bias voltage is a first bias voltage, and the signal drive level is a first signal drive level, the system further comprising:
   a second optical modulator included within the second optical transmitter, the second optical transmitter being configured to transmit optical signals, the second optical modulator configured to modulate continuous wave light provided by a second transmission laser in response to a second bias current and a second signal drive level applied to the second optical modulator, wherein the second optical modulator is structured such that the second bias voltage and the second signal drive level at least partially control a pulse shape of the optical signals transmitted by the second optical transmitter; and
   a second control circuit configured to adaptively adjust the second bias voltage and the second signal drive level applied to the second optical modulator based on data received by the second optical receiver, the second optical receiver being further configured to receive data indicative of one or more transmission parameters of the optical signals transmitted from the second optical transmitter, the data indicative of the one or more transmission parameters being received from the first optical transmitter, the one or more transmission parameters of the optical signals transmitted by the second optical transmitter being determined by the first receiver;
   wherein the second control circuit adaptively adjusts the second bias voltage and the second signal drive level applied to the second optical modulator until the pulse shape of the optical signals transmitted by the second optical transmitter is at least partially optimized for both linear and non-linear optical effects and dispersion in a second optical fiber link coupling the second optical transmitter and the first optical receiver, wherein the second bias voltage and the second signal drive level are adjusted concurrently.

9. The system in accordance with claim 7, wherein the one or more transmission parameters are bit error rate (BER).

10. A method for optimizing transmission between two end-point nodes in a system, the system including at least a first end-point node that is optically coupled to a second end-point node, the method comprising:
   an act of an optical transmitter of the first end-point node transmitting optical signals to an optical receiver of the second end-point node that is configured to receive the optical signals and determine one or more transmission parameters of the received optical signals, wherein an optical modulator of the optical transmitter receives and gates continuous wave light received from a transmission laser, wherein a bias current and a signal drive level are applied to the optical modulator to control gating of the continuous wave light such that the bias voltage and the signal drive level applied to the optical modulator at least partially control a pulse shape of the optical signal transmitted by the optical transmitter;
   an act of an optical receiver of the first end-point node receiving data indicative of the one or more transmission parameters of the transmitted optical signals from an optical transmitter of the second end-point node; and
   an act of a control circuit or the first end-point node adaptively adjusting the bias voltage and signal drive level based on the received data to at least partially optimize the pulse shape of the optical signal transmitted by the optical transmitter of the first end-point node for both linear and non-linear optical effects and dispersion in a transmission line configured to transport the optical signal transmitted by the optical transmitter, wherein the bias voltage and signal drive level are adjusted concurrently, wherein the at least partially optimized pulse shape of the optical output signal is a non-sinusoidal pulse.

11. The method in accordance with claim 10, wherein the second end-point node includes a second control circuit and the optical transmitter of the second end-point node includes a second optical modulator and a second transmission laser, the method further comprising:
   an act of the optical transmitter of the second end-point node transmitting optical signals to the optical receiver of the first end-point node, the optical receiver of the first end-point node being configured to receive the optical signals transmitted by the optical transmitter of the second end-point node and to determine one or more transmission parameters of the optical signals received from the optical transmitter of the second end-point node, wherein the second optical modulator of the optical transmitter of the second end-point node receives and gates continuous wave light received from the second transmission laser, wherein a second bias current and a second signal drive level are applied to the second optical modulator to control gating of the continuous wave light received from the second transmission laser such that the second bias voltage and the second signal drive level at least partially control a pulse shape of the optical signal transmitted by the second optical transmitter;

an act of the optical receiver of the second end-point node receiving data indicative of the one or more transmission parameters of the optical signals transmitted by the optical transmitter of the second end-point node, the data received by the optical receiver of the second end-point node being received from the optical transmitter of the first end-point node; and an act of the second control circuit adaptively adjusting the second bias voltage and the second signal drive level based on the data received by the optical receiver of the second end-point node to at least partially optimize the pulse shape of the optical signal transmitted by the optical transmitter of the second end-point node for both linear and non-linear optical effects and dispersion in a transmission line configured to transport the optical signal transmitted by the optical transmitter of the second end-point node, wherein the second bias voltage and the second signal drive level are adjusted concurrently.

12. The method in accordance with claim 10, wherein the one or more transmission parameters are bit error rate (BER).

13. A computer program product for adaptively controlling an optical transmitter using a control circuit, the computer program product comprising physical computer readable medium having computer-executable instructions written thereon that, when executed by the control circuit, perform a method, the method comprising:

an act of the control circuit adaptively adjusting a bias voltage and a signal drive level applied to an optical modulator, wherein the optical modulator receives continuous wave light from a transmission laser, wherein the optical modulator gates the continuous wave light received from the transmission laser to produce an optical output signal, the modulator configured to gate the continuous wave light in response to the bias voltage and the signal drive level applied to the optical modulator, wherein the bias voltage and the signal drive level are adjusted concurrently and wherein the optical modulator is structured such that the bias voltage and signal drive level at least partially control a pulse shape of an optical output signal of the optical modulator; and an act of the control circuit continuing to adaptively adjust the bias voltage and signal drive level to at least partially optimize the pulse shape of the optical output signal for both linear and non-linear optical effects and dispersion in a transmission line configured to transport the optical output signal, wherein the at least partially optimized pulse shape of the optical output signal is a non-sinusoidal pulse.

14. The computer program product in accordance with claim 13, wherein the bias voltage and signal drive level are adaptively adjusted in dependence on a bit error rate (BER) measured at a remote receiver.

15. The computer program product in accordance with claim 13, wherein the optical modulator is a Mach-Zehnder (MZ) interferometer.

* * * * *